March 10, 1970  H. C. SWIFT  3,499,508
DISK PARKING BRAKE
Filed Feb. 15, 1968  4 Sheets-Sheet 1
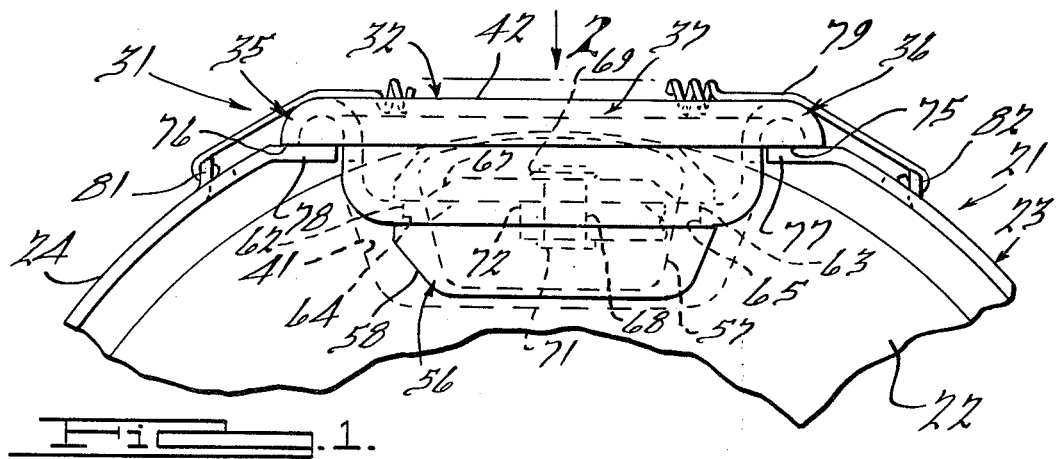
Fig. 1.
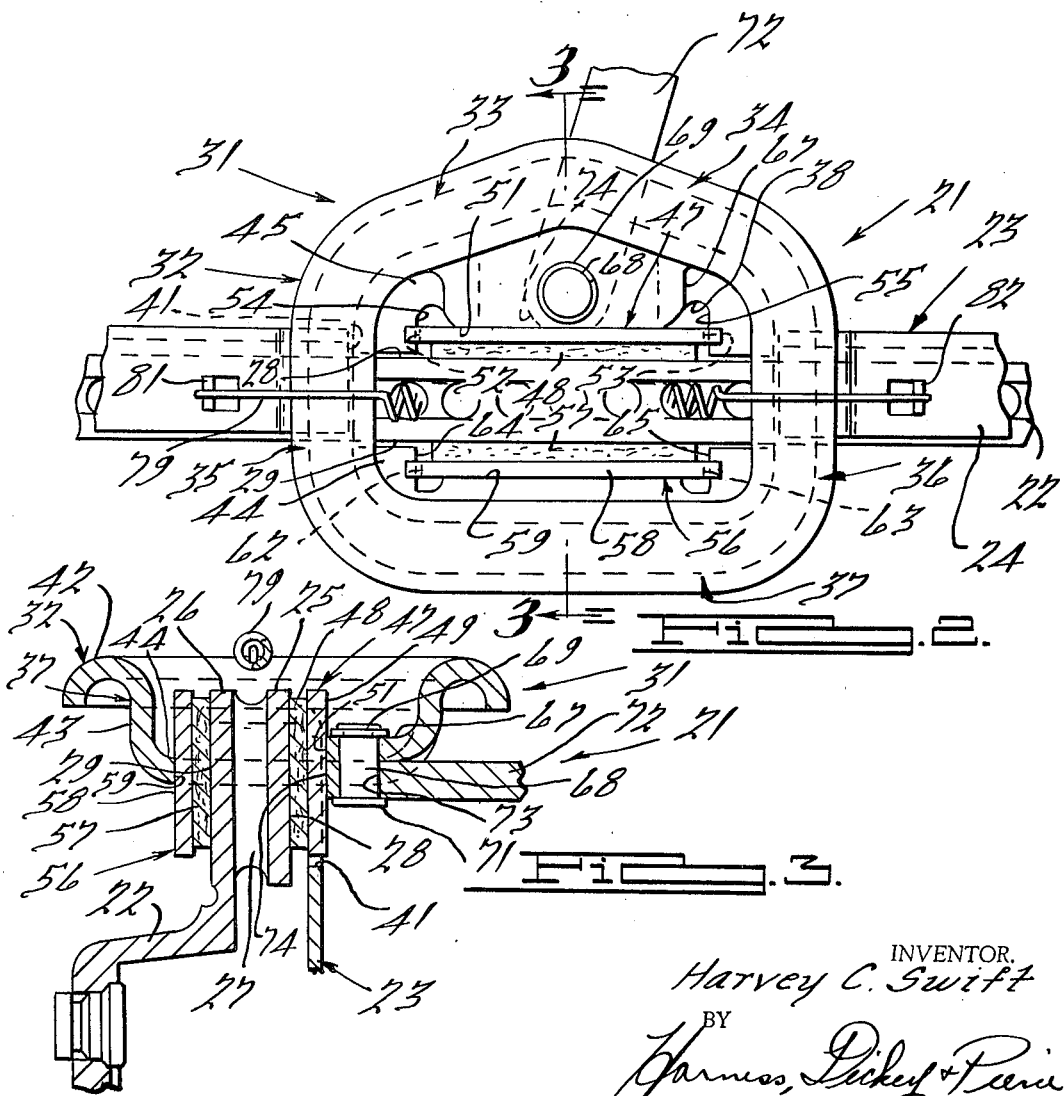
Fig. 2.
Fig. 3.
INVENTOR.
Harvey C. Swift
BY
Harness, Dickey & Pierce
ATTORNEYS

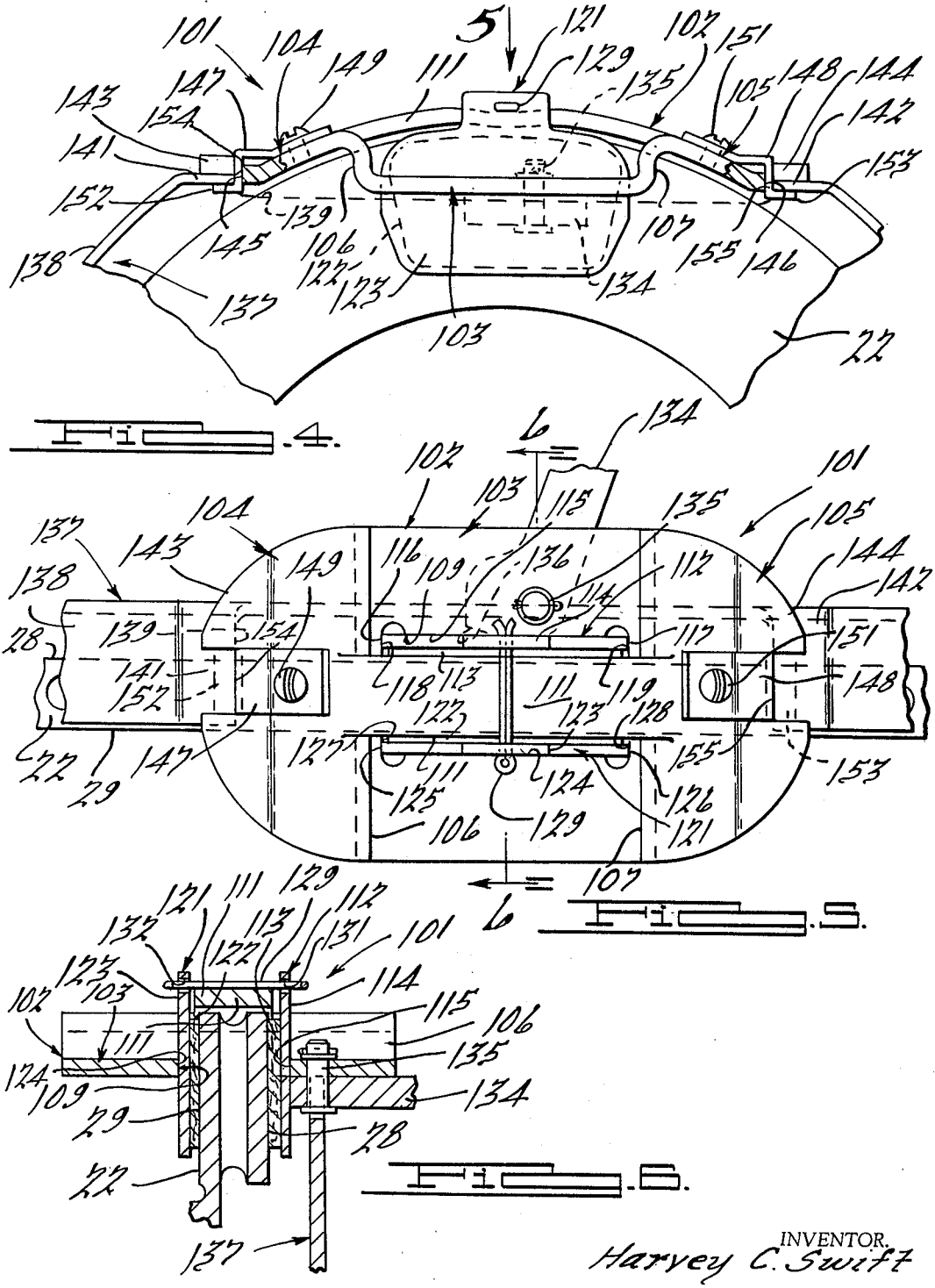

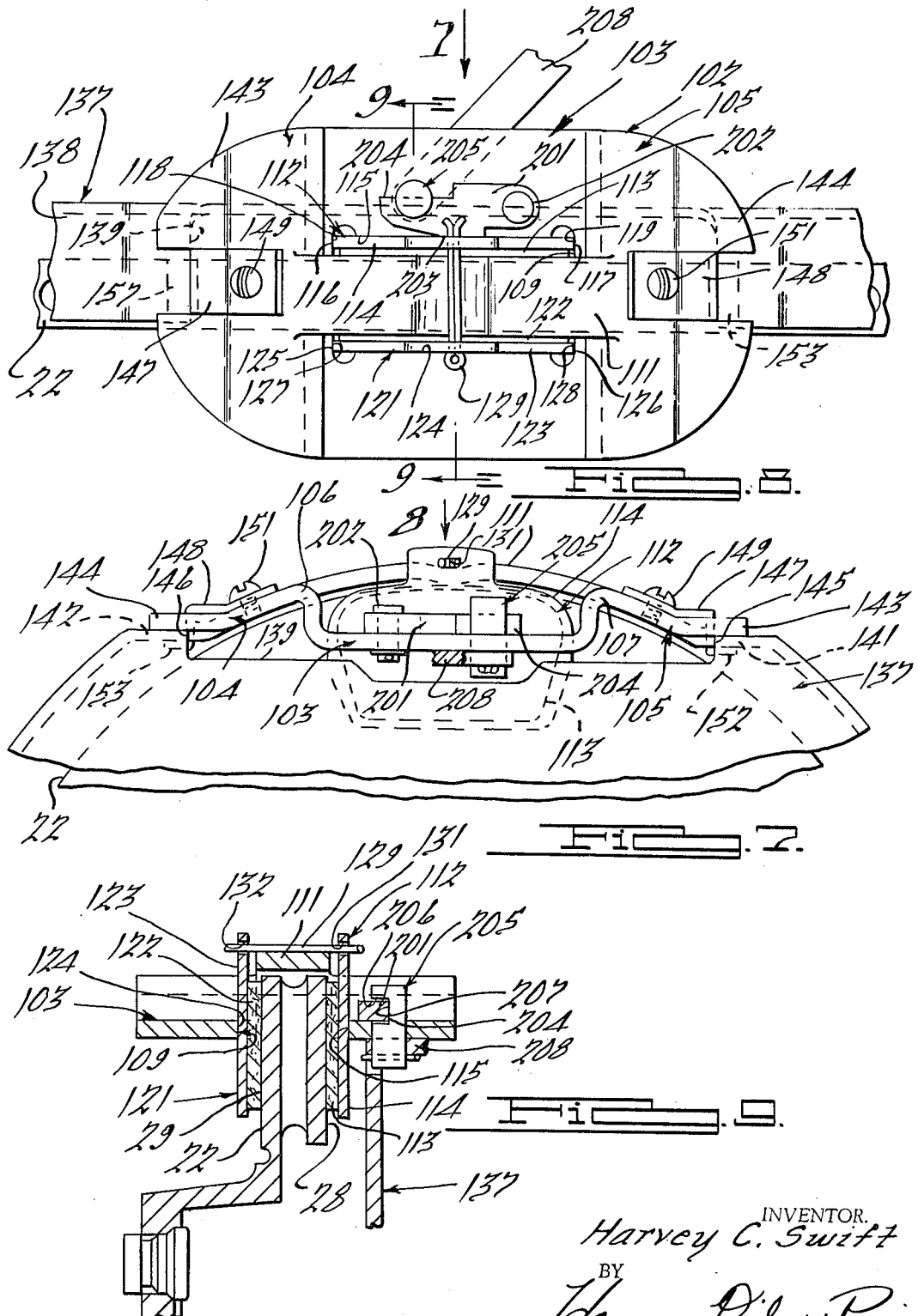

March 10, 1970 H. C. SWIFT 3,499,508
DISK PARKING BRAKE
Filed Feb. 15, 1968 4 Sheets-Sheet 4
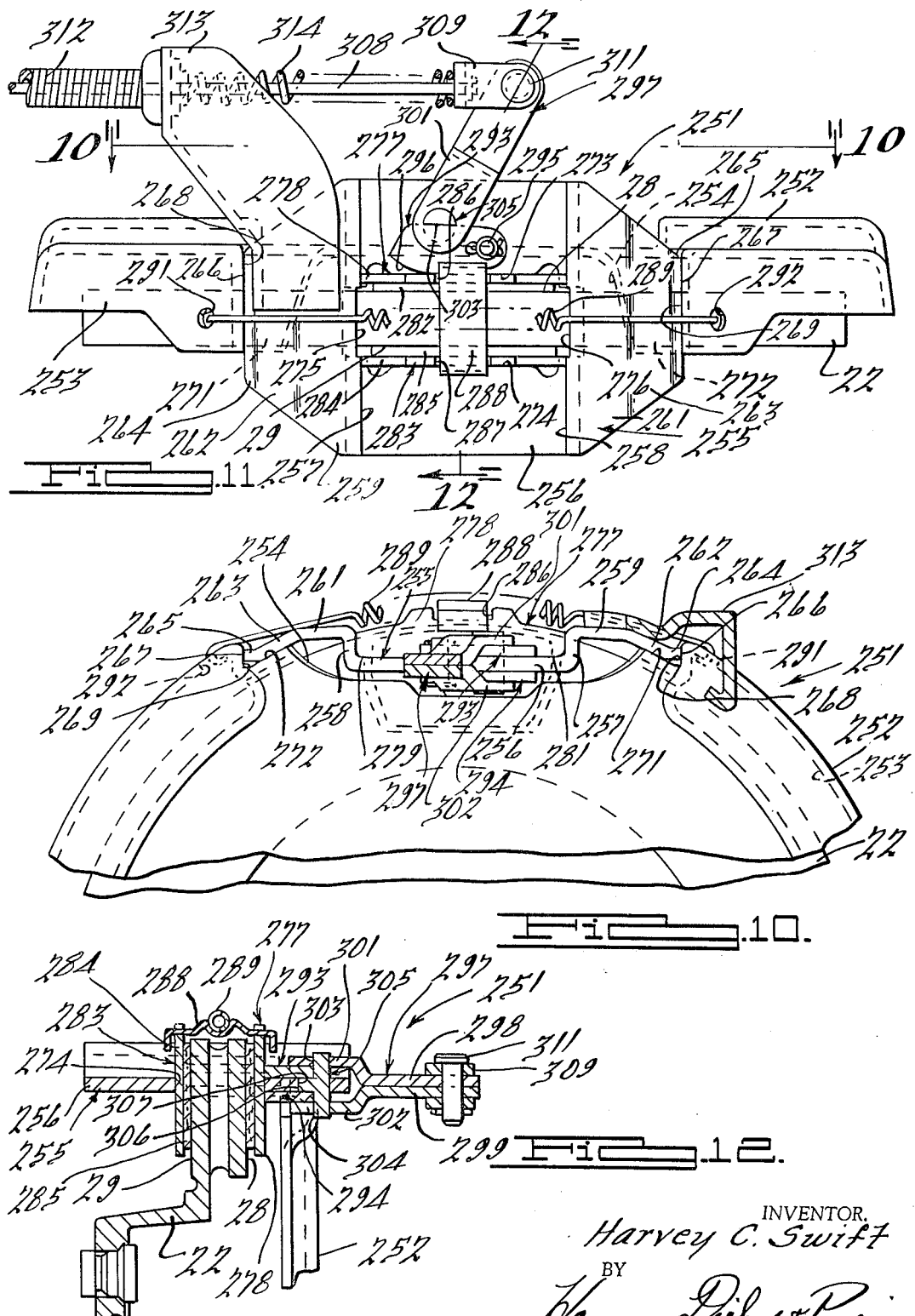
INVENTOR.
Harvey C. Swift
BY
Harness, Dickey & Pierce
ATTORNEYS.

United States Patent Office 3,499,508
Patented Mar. 10, 1970

3,499,508
DISK PARKING BRAKE
Harvey C. Swift, Birmingham, Mich., assignor to Kelsey-Hayes Company, Romulus, Mich., a corporation of Delaware
Filed Feb. 15, 1968, Ser. No. 705,727
Int. Cl. F16d 55/00
U.S. Cl. 188—73          2 Claims

ABSTRACT OF THE DISCLOSURE

Several embodiments of disk type parking brakes for automotive applications. In each embodiment, a light weight parking brake assembly is provided that cooperates with the disk of the main brake assembly but which is operative and supported independently of the main brake system. In each embodiment the light-weight construction is facilitated through the use of a sheet metal caliper assembly.

BACKGROUND OF THE INVENTION

This invention relates to a disk type parking brake and more particularly to an improved, light-weight disk type parking brake that is substantially independent of the main braking system.

The use of disk type brakes for automotive applications is well known. In such applications, it is necessary to provide an auxiliary or parking brake in addition to the main braking system. In one type of such parking brakes, it has been the practice to employ the same brake pads as the main brake system on certain wheels for accomplishing the auxiliary braking. This has been done by providing for both hydraulic and mechanical operation of the brake pads. The dual use of the braking pads has several disadvantages. For example, since the parking brake is only provided on the rear wheels, it has been necessary to use different main braking system components for the front and rear wheels. In addition, the design of the brake system to accommodate both mechanical and hydraulic operation may lead to some design compromises, may make pad replacement of the main braking system more difficult and may otherwise unduly complicate the main braking system.

As an alternative to the use of the main braking pads for the parking brake, it has been proposed to provide separate parking brake pads. However, these pads, heretofore, have been supported by the caliper assembly of the main brake. Such a system makes a bulkier overall package and may make placement of the braking assembly more difficult. In addition, with this type of parking brake system, it has been difficult to correctly locate the parking brake pads with respect to the disk and to correctly position the parking brake actuating mechanism.

It is, therefore, a principal object of this invention to provide a disk type parking brake that employs brake pads separate from those of the main braking system.

It is another object of this invention to provide a disk type parking brake that is supported independently of the main brakes.

It is a further object of the invention to provide a disk type parking brake that operates on the same disk as the main brake but which is supported and operated independently of the main brake.

The use of certain components of the main braking system for the parking brake, as heretofore has been proposed, frequently added unnecessary weight to the parking brake system. Generally the loads imposed upon the parking brake system are considerably less than the loads imposed on the main brake system. It is, therefore, still a further object of this invention to provide a lightweight disk type parking brake assembly.

It is a still further object to provide a light-weight stamped caliper assembly for a disk type brake.

SUMMARY OF THE INVENTION

A disk type parking brake embodying this invention is particularly adapted for use in a vehicle having a rotatable brake disk and a main braking system embodying a friction pad and actuating means for bringing the friction pad into engagement with the disk. The auxiliary parking brake system is supported relative to the disk independently of the main brake and is adapted to coact with the disk for holding the disk against rotation. The parking brake system is comprised of a supporting member positioned adjacent the disk, a friction pad supported for movement relative to the supporting member into and out of engagement with the disk, lever means pivotally supported by the supporting member and engageable with the friction pad for moving the friction pad into engagement with the disk upon pivotal movement of the lever means and mechanically operated means for pivoting the lever to actuate the parking brake.

A parking brake embodying this invention and adapted for application as described in the preceding paragraph may comprise a formed sheet metal caliper. The sheet metal caliper has first and second integrally connected end portions disposed on opposite sides of the associated disk. The sheet metal caliper is supported for sliding movement in a direction parallel to the axis of rotation of the disk and for precluding rotation of the caliper about the disk axis. A first brake pad is interposed between the first caliper end portion and the disk and is associated with a first braking surface of the disk. An actuating lever is pivotally supported upon the first caliper end portion and is operatively connected to the first brake pad for moving the first brake pad into engagement with the first disk braking surface upon pivotal movement of the lever. A second brake pad is abuttingly engaged with the second caliper end portion and is interposed between this caliper end portion and another braking surface of the disk. This second brake pad is brought into engagement with the respective braking surface of the disk upon pivotal movement of the lever and the sliding movement of the sheet metal caliper in the direction parallel to the axis of rotation of the disk.

BRIEF DESCRIPTION OF THE DRAWINGS

FIGURE 1 is a partial, side elevational view of an automotive brake system of the disk type and incorporating a first embodiment of the invention.

FIGURE 2 is a top plan view taken in the direction of the arrow 2 in FIGURE 1.

FIGURE 3 is a cross sectional view taken along the line 3—3 of FIGURE 2.

FIGURE 4 is a side elevational view, in part similar to FIGURE 1, showing a second embodiment of the invention.

FIGURE 5 is a top plan view taken in the direction of the arrow 5 in FIGURE 4.

FIGURE 6 is a cross sectional view taken along the line 6—6 of FIGURE 5.

FIGURE 7 is a side elevational view, in part similar to FIGURES 1 and 4, showing a further embodiment of the invention and taken in the direction of the arrow 7 in FIGURE 8.

FIGURE 8 is a top plan view taken in the direction of the arrow 8 in FIGURE 7.

FIGURE 9 is a cross sectional view taken along the line 9—9 of FIGURE 8.

FIGURE 10 is a cross sectional view taken generally along the line 10—10 in FIGURE 11, showing a further embodiment of the invention.

FIGURE 11 is a top plan view of the embodiment shown in FIGURE 10.

FIGURE 12 is a cross sectional view taken along the line 12—12 of FIGURE 11.

DETAILED DESCRIPTION OF THE PREFERRED EMBODIMENTS

Referring first to the embodiment shown in FIGURES 1 through 3, an automotive disk brake assembly embodying this invention is identified generally by the reference numeral 21. The brake assembly 21 is comprised of a disk or rotor 22 that is fixed in any known manner for rotation with an associated vehicular wheel, in this case one of the rear wheels. A main brake comprised of a caliper, associated brake pads and a hydraulic actuating mechanism (not shown) is mounted at any desired angular position with respect to the disk 22 in any known manner. The brake assembly 21 also includes a sheet metal dust shield 23 that is fixed against rotation with respect to the disk 22 adjacent one of its sides and which has an outwardly extending flange 24 that overlies a portion of the outer periphery of the disk 22. The disk 22 is depicted as being of the ventilated type and has a pair of spaced annular segments 25 and 26 that are integrally connected by circumferentially spaced, radially extending spacer ribs 27 to define ventilating air gaps. The segments 25 and 26 define oppositely facing, radially extending braking surfaces 28 and 29, respectively. The construction thus far described may be considered to be conventional in disk brake construction.

A light-weight parking brake assembly incorporating a first embodiment of the invention is identified generally by the reference numeral 31 and is supported adjacent the disk 22 by the dust shield 23 in a manner to be described. The parking brake assembly 31 may be disposed at any location with respect to the main brake assembly (not shown) where convenient.

In the drawings the parking brake assembly 31 is depicted, by way of example, at the top of the disk. The parking brake assembly 31, however, may be located at any desired position relative to the disk 22 and may be disposed 180° from the main brake assembly, 90° from the main brake assembly, or immediately adjacent the main brake assembly or at any other desired relative position. The light-weight and relatively small construction of the parking brake assembly 31 facilitates this variation in mounting location.

The parking brake assembly 31 is comprised of a formed sheet metal caliper 32 which is depicted as having an oval or slightly D-shape as viewed in top plan (FIGURE 2). The caliper has a first end portion comprised of converging legs 33 and 34 that are disposed on the side of the disk 22 adjacent its braking surface 28. Inter-connecting portions 35 and 36 extend integrally from the opposite ends of the legs 33 and 34, across the outer periphery of the disk 22 and terminate at a second end portion 37 that extends on the side of the disk 22 immediately adjacent the disk braking surface 29. The caliper assembly 32 defines a central opening or throat 38 through which a portion of the disk 22 extends. The portion of the dust shield 23 adjacent the parking brake assembly 31 is cut away, as at 41, to clear the parking brake assembly.

The sheet metal caliper 32 is structurally reinforced by means of an arcuate section 42 that extends around the upper periphery of the caliper 32. The arcuate section 42 extends completely around the caliper 32 and defines a portion of the first end portion defined by the legs 33 and 34, the second end portion 37 and intermediate portions 35, 36 as does a downwardly extending section 43 formed at the inner termination of the arcuate section 42. Adjacent the second end portion 37, the portion 43 terminates in an outwardly extending flange 44 that extends toward the disk braking surface 29. A like outwardly extending flange 45 is formed integrally with the portion 43 adjacent the legs 33 and 34.

A first brake pad, indicated generally by the reference numeral 47 is supported by the caliper assembly 32 between the flange 45 and the braking surface 28. The first brake pad 47 has a frictional lining 48 that is adapted to engage the disk braking surface 28 and which is connected, as by riveting or bonding, to a backing plate 49. The backing plate 49 is juxtaposed to an inner edge 51 of the flange 45 and is formed with slots 52 and 53 (FIG. 2) at its opposite edges that receive inwardly extending tabs 54 and 55 of the flange 45 to support the brake pad 47 in a vertical direction with respect to the caliper 32.

A second brake pad 56 is interposed between the caliper end portion 37 and the disk braking surface 29. This second brake pad 56 includes a frictional lining 57 adapted to engage the disk surface 29 and which is fixed by bonding or riveting to a backing plate 58. The backing plate 58 is abuttingly engaged with an inwardly facing shoulder 59 of the caliper flange 44 and is formed with slots 62 and 63 at its ouer edges. The slots 62 and 63 receive tabs 64 and 65, respectively, of the flange 44 to vertically support the brake pad 56 with respect to the caliper 32.

The caliper flange 45 is formed with an upwardly embossed section 67 adjacent the backing plate 49 of the brake pad 47. A pivot pin 68 extends through the embossed section 67 and is axially retained by means of a snap ring 69. The pivot pin 68 has an enlarged head 71 that engages the underside of an operating lever 72 having a bore 73 for pivotally journaling the operating lever 72 upon the pivot pin 68. The operating lever 72 has an eccentric end portion 74 that engages the brake pad backing plate 49. The operating lever 72 is normally spring biased in any known means (not shown) to a retracted or released position wherein the brake pads 47 and 56 are released and have at the most only light rubbing engagement with the braking surfaces 28 and 29 of the disk 22. The outer end of the lever 72 is connected by means of a cable (not shown) or in any other known manner to the parking brake operator located within the passenger compartment of the associated vehicle.

In order to actuate the parking brake assembly 31, the lever 72 is pivoted so that the eccentric cam surface 74 forces the brake pad 49 into frictional engagement with the disk surface 28. At the same time, a reactive force will be exerted upon the caliper 32 tending to slide it to the right as viewed in FIGURE 3 in a manner that will become more apparent as this description proceeds. The flange surface 59 will then urge the brake pad 56 into engagement with the frictional surface 29 effecting engagement of both of the brake pads with the disk 22.

When the brake pads 47 and 56 are frictionally engaged with the disk 22, the entire parking brake assembly 31 will tend to rotate in the same direction as the direction of rotation of the disk 22. This rotation is precluded regardless of the direction of rotation of the disk 22 by the engagement of downwardly facing shoulders 75 and 76 formed in the interconnecting portions 36 and 35, respectively, at the termination of the arcuate portion 42 and of oppositely facing, outer surfaces of the section 43 with flattened tabs 77 and 78, respectively, formed at the outer edge of the dust shield flange 24 adjacent the cutout 41. Hence, the torque reaction transmitted from the backing plates 49 and 58 to the tabs 54 and 55 and 64 and 65, respectively, will be transmitted to and taken by the dust shield 23. The support of the caliper 32 on the dust shield tabs 77 and 78, however, permits the aforenoted sliding movement of the caliper 32 in a direction parallel to the axis of rotation of the disk 22.

In order to preclude any radial outward movement of the parking brake assembly 31 with respect to the disk 22 and dust shield 23, a tension spring 79 extends across the upper edge of the caliper section 42. Opposite ends of the spring 79 are received in tabs 81 and 82 struck out of the dust shield flange 24 adjacent the tabs 77 and 78.

When the linings 48 and 57 of the brake pads 47 and 56 become worn, the pads may conveniently be replaced by removing the spring 79 and lifting the caliper 32 from around the disk 22. Replacement of the pads 47 and 56 through the opening 38 between the tabs 54 and 64 and 55 and 65 is then possible.

Referring now to FIGURES 4 through 6, a second embodiment of the lightweight auxiliary or parking disk brake is identified generally by the reference numeral 101. Like the parking brake of the previously described embodiment, the parking brake 101 is adapted to coact with a rotatable disk 22 of a vehicular wheel braking system which disk defines oppositely facing, radially extending braking surfaces 28 and 29. Also, as in the previously described embodiment, the parking brake 101 is adapted to be positioned at any desired angular location with respect to the disk 22, and may be spaced at any location with respect to the main disk type brake (not shown), which may be of any known type.

The parking brake assembly 101 includes a stamped sheet metal caliper 102 having a generally oval configuration in top plan (FIGURE 5) and made up of a planar central section 103 and downwardly extending end sections 104 and 105 that are integrally connected to the central section 103 by means of arcuate sections 106 and 107, respectively. The central section 103 is formed with an opening or throat 109 through which a portion of the disk 22 extends. The opening 109 is formed in part by an upwardly struck strap portion 111 that extends across the outer periphery of the disk 22.

A first brake pad 112 is received in the opening 109 on the side of the disk 22 adjacent the braking surface 28. The pad 112 has a frictional lining 113 that is juxtaposed to the disk braking surface 28 and which is affixed to a backing plate 14 as by riveting or bonding. The backing plate 114 is juxtaposed to a shoulder 115 defined by the caliper section 103 adjacent the opening 109 and has its opposite edges 116 and 117 abuttingly engaged with shoulders 118 and 119, respectively, formed by the caliper section 103. The engagement between the surfaces 116 and 118 and 117 and 119 precludes rotation of the brake pad 112 with respect to the caliper 102.

A second brake pad 121 is interposed in the opening 109 opposite edges 125 and 126 of the backing plate 123 29. The brake pad 121 has a frictional lining material 122 that is juxtaposed to the braking surface 29 and that is affixed in any known manner to a backing plate 123. The backing plate 123 is engaged by a shoulder 124 formed by the caliper section 103. Adjacent the opening 109 opposite edges 125 and 126 of the backing plate 123 are abuttingly engaged with shoulders 127 and 128 formed by the caliper section 103 to preclude rotation of the brake pad 121 with respect to the caliper 102.

A cotter key or the like 129 extends through bores 131 and 132 formed in upstanding tabs of the backing plates 114 and 123, respectively, and engages the upper surface of the strap 111 to hold the brake pads 112 and 121 in a fixed radial position with respect to the disk 22. The edges 116 and 117 of the brake pad backing plate 114 and the edges 125 and 126 of the backing plate 123 of the brake pad 121 may taper outwardly so that they define apexes as shown in FIGURE 4, that are spaced apart a greater distance than the distance between the respective shoulders 118 and 119 and 127 and 128 to preclude radial outward displacement of the respective brake shoes relative to the caliper 102. The brake pads 112 and 121 may be readily replaced, however, by withdrawing the cotter key 129 and passing the spent brake pads in a radial inward direction with respect to the caliper. If the backing plates 114 and 123 are not tapered, the pads 112 and 121 may also be withdrawn in a radial outward sense.

An operating lever 134 is pivoted upon the caliper section 103 by means of a pivot pin 135, that is held in place axially in any known manner. The operating lever 134 has an eccentric cam surface 136 that engages the backing plate 114 of the brake pad 112. The lever 134 is biased in any known manner to a released position and is operated by a flexible cable or the like in a known manner. Pivotal movement of the operating lever 134 about the pivot pin 135 creates a force on the brake pad 112 moving it axially into engagement with the braking surface 28. At the same time, the caliper 102 will be moved to the right as viewed in FIGURE 6 by the reaction force upon the pivot pin 135. The engagement between the shoulder 124 and the backing plate 123 of the brake pad 121 will force its frictional lining 122 into engagement with the braking surface 29.

It has been previously noted that the torque reaction is transmitted from the brake pads 112 and 121 to the caliper 102. Rotation of the caliper 102 with the disk 22 is precluded and the caliper 102 is supported for sliding movement in a direction parallel to the axis of rotation of the disk 22 by the construction now to be described. As in the previously described embodiment, the brake assembly includes a sheet metal dust shield 137 that is formed with an outstanding generally cylindrical flange 138 that overlies a portion of the disk 22. This dust shield is cut away, as at 139 in the area of the parking brake assembly 101. In addition, the flange 138 is formed with flattened portions 141 and 142 adjacent the cutout 139. Flattened end portions 143 and 144 of the caliper 102 engage and are slidably supported upon these dust shield flanges 141 and 142. The end portions 143 and 144 are slightly bifurcated and are indented to form shoulders 145 and 146. These shoulders are engaged by clips 147 and 148, respectively, which clips are held to the caliper 102 by threaded fasteners 149 and 151, respectively. The clips have tangs 152 and 153 that engage the underside of the flanges 141 and 142 to hold the brake assembly 101 against radial outward movement relative to the dust shield 137. The abutment between the clips 147 and 148 and inner edges 154 and 155 of the flanges 141, 142 transmits the frictional braking force from the caliper 102 to the dust shield 137, but permits sliding movement of the caliper 102. Hence, the caliper 102 is supported for sliding movement with respect to the dust shield 137 in a direction parallel to the axis of rotation of the disk 22 is held against rotation with the disk 22 about its axis.

Referring now to the embodiment of FIGURES 7 through 9, this embodiment is similar in many respects to the embodiment shown in FIGURES 4 through 6 and like parts have been identified by like reference numerals. More specifically, in this embodiment the construction of the brake pads, the caliper and the method of support for the caliper is the same as that previously described.

In this embodiment, however, an operating structure is provided that magnifies the axial movement of the brake pads 112 and 121 for a given degree of pivotal movement of the operating lever. In this embodiment, an operating lever 201 is supported upon the caliper portion 103 for pivotal movement by means of a pivot pin 202. The operating lever 201 has a cam surface 203 that engages the backing plate 114 of the brake pad 112. The lever 201 is also formed with a flat surface 204 that is engaged within a recess 206 of an actuating pin 205 that is journaled upon the caliper portion 103. The recess 206 is defined, in part, by a generally flat surface 207. An actuating lever 208 is affixed to the actuating pin 205 on the underside of the caliper portion 103 and is connected in any known manner to the parking brake actuating mechanism within the operator's compartment.

The parking brake is shown in its released position in FIGURES 7 through 9. When the parking brake is actuated, the actuating lever 208 and its associated actuating pin 205 are pivoted. The flat surface 207 of the actuating pin 205 cams the operating lever 201 in a counterclockwise direction, about the pivot pin 202, as viewed in FIGURE 8. This motion is transmitted from the cam surface 203 to the backing plate 114 of the pad 112 and the reaction force actuates the brake pad 121 as in the previously described embodiment.

It should be readily apparent that this construction permits a greater movement of the brake pads for a given degree of total movement of the operating lever due to the mechanical advantage of the linkage system employed. It should also be obvious that this type of actuating mechanism may be used in connection with brakes having a construction in accordance with the embodiment of FIGURES 1 through 3.

Referring now to the embodiment shown in FIGURES 10 through 12, a fourth embodiment of a light weight auxiliary or parking disk brake is identified generally by the reference numeral 251. Like the parking brakes of the previously described embodiments, the parking brake 251 is adapted to coact with a rotatable disk 22 of a vehicular wheel braking system, which disk defines oppositely facing, radially extending braking surfaces 28 and 29. Also, as in the previously described embodiments, the parking brake 251 is adapted to be positioned at any desired angular location with respect to the disk 22 and may be spaced at any location with respect to the main disk type brake (not shown), which may be of any known type.

As in the previously described embodiments, the main parking brake includes a dust shield 252 that is fixed against rotation relative to the disk 22 and which has an outstanding flange 253 that overlies the outer periphery of the disk 22. A portion of the dust shield 252 is cut away, as at 254, to clear a portion of the parking brake assembly 251 in a manner to become more apparent as this description proceeds.

The parking brake assembly 251 includes a formed sheet metal caliper, indicated generally by the reference numeral 255. The caliper 255 is made up of a planar central section 256 that terminates at each end in upturned sections 257 and 258. The opposite ends of the upturned sections 257 and 258 terminate in outwardly extending sections 259 and 261, respectively, from which downwardly extending sections 262 and 263 extend. The sections 262 and 263, in turn, terminate in offset sections 264 and 265, each of which defines a respective shoulder 266 and 267. The shoulders 266 and 267 engage shoulders 268 and 269 formed by offset sections of the dust shield flange 253. Adjacent the dust shield shoulders 268 and 269, the dust shield is formed with circumferentially extending sections 271 and 272 that underlie the caliper sections 264 and 265 and provide radial or vertical support for the caliper 255.

The planar section 256 of the caliper 255 is formed with an opening or throat which is formed in part by oppositely facing shoulders 273 and 274 formed on opposite sides of the disk 22. The disk 22 extends at least in part through this opening and in order to afford clearance for the disk 22, the caliper sections 257 and 258 may also be cut away, as at 275 and 276.

A first brake pad, indicated generally by the reference numeral 277, is supported in the caliper throat between the shoulder 273 and the braking surface 28 of the disk 22. The disk brake pad 277 is formed with a backing plate 278 that defines downwardly facing surfaces 279 and 281 that engage the upper surface of the caliper section 256 to provide radial support for the brake pad 277. A frictional lining 282 is affixed in any known manner to the backing plate 278 and is adapted to frictionally engage the disk braking surface 28.

A second brake pad, indicated generally by the reference numeral 283, is interposed between the caliper shoulder 274 and the disk braking surface 29. The brake pad 283 is also comprised of a backing plate 284 that has downwardly facing surfaces that are supportingly engaged upon the caliper section 256. A frictional lining 285 is fixed in any known manner to the backing plate 284 and is adapted to frictionally engage the disk brake surface 29.

The backing plates 278 and 284 are formed with notched central portions 286 and 287 across which a generally channel shaped retaining member 288 extends. A tension spring 289 extends across the retaining member 288 and has its opposite ends fixed in apertures 291 and 292 formed in the dust shield 252. The spring 289 exerts a force on the brake pads 278 and 283 through the retaining member 288 that precludes any substantial radial outward displacement of these brake pads.

A pair of operating levers 293 and 294 are supported for pivotal movement on the upper and lower sides of the caliper section 256 by means of a pivot pin 295. Each of the operating levers 293 and 294 is formed with a cam surface 296 that engages the rear surface of the backing plate 278 and which is adapted to operate the parking brake assembly 251 upon pivotal movement in a manner which will become more apparent as this description proceeds.

A bifurcated actuating lever 297 is juxtaposed to the operating levers 293 and 294. The actuating lever 297 is comprised of two formed pieces having abutting legs 298 and 299 that are affixed together in any known manner, as by means of a spot weld. Offset legs 301 and 302 extend from the legs 298 and 299, respectively, on opposite sides of the caliper section 256. The legs 301 and 302 receive half round sections 303 and 304, respectively, of an actuating pin 305 in complementary shaped apertures. The actuating pin 305 is, therefore, fixed against rotation with respect to the actuating lever 297. The central portion of the actuating pin 305 is formed with a cylindrical section 306 that is journaled for rotation in a complementary aperture 307 formed in the caliper section 256. The actuating lever legs 301 and 302 straddle the respective operating levers 293 and 294 and the flat portion of the actuating pin segmnets 303 and 304 engage the rear surface of the respective operating levers 293 and 294.

The outer end of the actuating lever 297 is connected to an actuating mechanism located within the passenger compartment of the associated vehicle, as by means of a flexible transmitter 308 that is pivotally connected to the outer end of the actuating lever 297 by means of a trunnion 309 and pivot pin 311. A protective sheath 312 encircles a portion of the flexible transmitter 308 and terminates adjacent a supporting bracket 313 that is affixed to the caliper section 259. A coil compression spring 314 encircles the exposed portion of the flexible transmitter 308 and engages the supporting bracket 313 and trunion 309 to normally urge the actuating lever in a clockwise direction as viewed in FIGURE 11 wherein the parking brake assembly 251 is in its released position.

To actuate the parking brake assembly 251, the flexible transmitter 308 is tensioned to compress the spring 314 and pivot the actuating lever 297 in a counterclockwise direction. The rotation of the flats of the actuating pin sections 303 and 304 causes the operating levers 293 and 294 to be cammed in a counterclockwise direction. The levers 293 and 294, therefore, exert a force upon the brake pad 278 that moves it axially into engagement with the associated disk braking surface 28. A reaction force is also transmitted to the caliper 255 through the actuating pin 305 that tends to shift the caliper in an upward direction as viewed in FIGURE 11. The caliper shoulder 274 thus forces the brake pad 283 into frictional engagement with the disk braking surface 29. This sliding movement is permitted by the support of the caliper sections 264 and 265 on the dust shield flanges 271 and 272. When the frictional linings 282 and 285 of the brake pads engage the disk 22, the entire parking brake assembly 251 tends to rotate in the same direction as the disk 22. Such rotation of the parking brake assembly 251 is however, precluded by the engagement of the caliper shoulders 266 or 267 with the dust shield shoulders 268 or 269. In addition, the outwardly extending portions of the backing plates 278 and 284 engage the caliper sections 257 and 258 to preclude any substantial movement of the brake pads 277 and 283 in a circumferential direction. To release the parking brake assembly 251, the tension on the flexible transmitter 308 is released and the spring 314 effects clockwise rotation of the actuating lever 297.

While it will be apparent that the preferred embodiments of the invention disclosed are well calculated to fulfill the objects above stated, it will be appreciated that the invention is susceptible to modification, variation and change.

What is claimed is:

1. A disk type parking brake for braking a rotatable disk associated with a vehicular wheel or the like, said parking brake comprising a formed sheet metal caliper having first and second end portions integrally connected at respective ends thereof by spaced intermediate portions, said intermediate portions and said end portions defining a throat through which the associated disk is adapted to extend in part, each of said end portions and said intermediate portions being comprised of an arcuate section and a generally straight section extending from one end of the respective arcuate section for structurally reinforcing said caliper, said straight sections extending in a generally chordal direction with respect to the disk, said arcuate sections being curved outwardly from the plane defined by said straight sections, means engaged with said arcuate section for supporting said sheet metal caliper for sliding movement in a direction perpendicular to the axis of rotation of the disk and for precluding rotation of said sheet metal caliper about the disk axis of rotation, a first brake pad interposed between said first caliper end portion and the disk and associated with a first braking surface of the disk, an actuating lever pivotally supported on said first caliper end portion, means for pivoting said actuating lever, means operatively connecting said actuating lever to said first brake pad for moving said brake pad into engagement with the first disk braking surface upon pivotal movement of said actuating lever and for sliding said sheet metal caliper in said perpendicular direction, and a second brake pad abuttingly engaged with said second caliper end portion and interposed between said second caliper end portion and a second braking surface of the disk, said second brake pad being engageable with the second disk braking surface upon sliding movement of said sheet metal caliper in said perpendicular direction.

2. A disk type parking brake as set forth in claim 1 wherein the straight section of the first caliper end portion has outstanding flange means defining spaced tabs, the straight section of the second caliper end portion having flange means defining spaced tabs, each of the brake pads comprising a frictional lining and a backing plate, the backing plate of each of said brake pads defining slots for receiving the respective tabs of said caliper end portions for supporting the brake pad relative to the respective of said end portions.

References Cited

UNITED STATES PATENTS

| 3,077,954 | 2/1963 | Ihnacik | 188—73 |
| 3,065,829 | 11/1962 | Bessler et al. | |
| 3,310,135 | 3/1967 | Wells | 188—73 |
| 3,330,385 | 7/1967 | Swift | 188—73 |
| 3,335,819 | 8/1967 | Swift | 188—73 |
| 3,335,820 | 8/1967 | Burnett. | |
| 3,365,030 | 1/1968 | Cochrane. | |

FOREIGN PATENTS

| 1,009,843 | 11/1965 | Great Britain. |
| 1,016,565 | 1/1966 | Great Britain. |

GEORGE E. A. HALVOSA, Primary Examiner

PO-1050
(5/69)

UNITED STATES PATENT OFFICE
CERTIFICATE OF CORRECTION

Patent No. 3,499,508　　　　　　　　Dated March 10, 1970

Inventor(s) Harvey C. Swift

It is certified that error appears in the above-identified patent and that said Letters Patent are hereby corrected as shown below:

Column 3, line 57 (application page 8, line 1),
　　"34, across" should have been --34, respectively, across--.
Column 4, line 21 (application page 9, lines 10 and 11)
　　"ouer" should have been --outer--.
Column 5, line 43 (application page 12, line 12)
　　after 109 delete "opposite edges 125 and 126 of the backing plate 123" and insert --between the caliper 102 and the disk braking surfaces--.
Column 6, line 43 (application page 14, line 23)
　　after "22" insert --but--.
Column 7, line 60 (application page 18, line 5)
　　after "The" omit --disk-- .
Column 8, line 35 (application page 20, line 3)
　　"segmnets" should have been --segments--.

SIGNED AND
SEALED
SEP 8 - 1970

(SEAL)
Attest:

Edward M. Fletcher, Jr.
Attesting Officer

WILLIAM E. SCHUYLER, JR.
Commissioner of Patents